(12) United States Patent
Nakajima (10) Patent No.: US 11,441,600 B2
(45) Date of Patent: Sep. 13, 2022

(54) SLIDING MEMBER

(71) Applicant: DAIDO METAL COMPANY LTD., Nagoya (JP)

(72) Inventor: Hideyuki Nakajima, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 57 days.

(21) Appl. No.: 17/159,590

(22) Filed: Jan. 27, 2021

(65) Prior Publication Data
US 2021/0246937 A1 Aug. 12, 2021

(30) Foreign Application Priority Data

Feb. 6, 2020 (JP) ............................ JP2020-018617

(51) Int. Cl.
*F16C 17/03* (2006.01)
*F16C 33/20* (2006.01)
(Continued)

(52) U.S. Cl.
CPC ............... *F16C 17/03* (2013.01); *C08K 3/04* (2013.01); *C08K 3/16* (2013.01); *C08K 3/34* (2013.01); *C08K 7/06* (2013.01); *C08K 7/10* (2013.01); *C08L 61/16* (2013.01); *F16C 17/02* (2013.01); *F16C 33/201* (2013.01); *C08K 2003/162* (2013.01); *F16C 2202/02* (2013.01); *F16C 2208/02* (2013.01); *F16C 2208/04* (2013.01); *F16C 2208/36* (2013.01); *F16C 2208/40* (2013.01); *F16C 2208/42* (2013.01);
(Continued)

(58) Field of Classification Search
CPC ...... F16C 17/03; F16C 17/06; F16C 2202/22; F16C 2208/02; F16C 2208/04; F16C 2208/36; F16C 2208/40; F16C 2208/42; F16C 2208/44; F16C 2208/52; F16C 2208/60; F16C 2208/78; F16C 2208/82; F16C 2208/86; F16C 2208/90; C08K 3/04; C08K 3/16; C08K 3/34; C08K 7/06; C08K 7/10; C08K 2003/162; C08L 61/16
See application file for complete search history.

(56) References Cited

U.S. PATENT DOCUMENTS

2010/0124388 A1* 5/2010 Long .................... B22F 7/08
384/126

FOREIGN PATENT DOCUMENTS

DE 19929412 A1 * 12/2000 .............. F16C 17/06
JP H10-204282 A 8/1998
(Continued)

*Primary Examiner* — Phillip A Johnson
(74) *Attorney, Agent, or Firm* — Harness, Dickey & Pierce, P.L.C.

(57) ABSTRACT

Provided is a sliding member for a journal bearing. The sliding member includes a back-metal layer and a sliding layer, and has a partially cylindrical shape. The sliding layer includes a synthetic resin and has a sliding surface. The sliding layer has a linear expansion coefficient KS in a direction parallel to a circumferential direction of the sliding member, a linear expansion coefficient KJ in a direction parallel to a center axis direction of the sliding member, and a linear expansion coefficient KT in a direction perpendicular to the sliding surface, and the linear expansion coefficients KS, KJ, and KT satisfy the following relations (1) and (2): Relation (1): $1.1 \leq KS/KJ \leq 2$; and Relation (2): $1.3 \leq KT/\{(KS+KJ)/2\} \leq 2.5$.

11 Claims, 3 Drawing Sheets

(51) Int. Cl.
*C08K 3/04* (2006.01)
*C08K 3/16* (2006.01)
*C08K 3/34* (2006.01)
*C08K 7/06* (2006.01)
*C08K 7/10* (2006.01)
*C08L 61/16* (2006.01)
*F16C 17/02* (2006.01)

(52) U.S. Cl.
CPC ...... *F16C 2208/44* (2013.01); *F16C 2208/52* (2013.01); *F16C 2208/60* (2013.01); *F16C 2208/78* (2013.01); *F16C 2208/82* (2013.01); *F16C 2208/86* (2013.01); *F16C 2208/90* (2013.01)

(56) References Cited

FOREIGN PATENT DOCUMENTS

| | | |
|---|---|---|
| JP | 2001-124062 A | 5/2001 |
| JP | 2004-156690 A | 6/2004 |
| JP | 2013-194204 A | 9/2013 |
| JP | 2016-079391 A | 5/2016 |
| JP | 2018-146059 A | 9/2018 |

* cited by examiner

SLIDING MEMBER

TECHNICAL FIELD

The present invention relates to a sliding member for a journal bearing, and specifically relates to a sliding member that has a partially cylindrical shape and includes a back-metal layer and a sliding layer including a synthetic resin composition. The present invention also relates to a journal bearing including the sliding member.

RELATED ART

A radial bearing has been used as a journal bearing for a rotating shaft of an exhaust turbine, a large-sized power generator or the like. Such radial bearing is configured that a plurality of bearing-pad-shaped sliding members having a circular-arc cross section are arranged to face a periphery of the rotating shaft (see JP 2004-156690A, for example). As a sliding member of such a radial bearing, a sliding member is known in which a sliding layer including a resin composition is coated on a back-metal layer made of a metal (see JP 2001-124062A, for example). For example, JP 10-204282A, JP 2016-079391A and JP 2013-194204A describe a sliding layer including a resin composition including dispersed fibrous particles such as glass fiber particles, carbon fiber particles or intermetallic compound fiber particles to enhance a strength of the sliding layer.

Furthermore, JP 2018-146059A describes a method of manufacturing a resin composition sheet, including cooling the sheet in a forming mold and periodically changing a drawing speed of a drawing roll.

SUMMARY OF THE INVENTION

During steady operation of the exhaust turbine, the large-sized power generator or the like, a fluid lubricating film of oil or the like is formed between a surface of the shaft member and a sliding surface of the sliding member to prevent direct contact between the surfaces of the shaft member and the sliding member. When the operation of the exhaust turbine, the large-sized power generator, or the like is started, however, the shaft in a stop state starts rotating, resulting in sliding between the surface of the shaft member and the sliding surface of the sliding member in direct contact with each other. When the surface of the shaft member slides against the sliding surface of the sliding member in this state, frictional heat is generated by the sliding, and thus a temperature of the resin composition is increased. At the same time, a portion of the resin composition near the sliding surface in contact with the shaft member is dragged by the shaft member and elastically deformed in a rotation direction of the shaft member.

It was found that, in this case, if the resin composition of the sliding layer is thermally expanded, due to frictional heat generated by sliding, in an almost isotropic manner in an in-plane direction of the sliding surface, damage such as a crack that extends in a substantially circumferential direction is highly likely to occur on the surface of the sliding layer, through the dragging of the resin composition by the shaft member.

Furthermore, another problem has been found that, when an amount of thermal expansion of the resin composition of the sliding layer is approximately same between the in-plane direction of the sliding surface and a direction perpendicular to the sliding surface (thickness direction), shear failure is more likely to occur at an interface between the back-metal layer made of metal and the sliding layer.

Thus, an object of the present invention is to overcome the disadvantages of the conventional technique and provide a sliding member that is less likely to be subjected to damage such as a crack on a surface of a sliding layer and shear failure between the sliding layer and a back-metal layer when the operation of a bearing device is started.

According to an aspect of the present invention, provided is a sliding member for a journal bearing. The sliding member includes a back-metal layer and a sliding layer on the back-metal layer, and has a partially cylindrical shape. The sliding layer includes a synthetic resin and has a sliding surface. The sliding layer has a linear expansion coefficient KS in a direction parallel to a circumferential direction of the sliding member, a linear expansion coefficient KJ in a direction parallel to a center axis direction of the sliding member, and a linear expansion coefficient KT in a direction perpendicular to the sliding surface, and the linear expansion coefficients KS, KJ and KT satisfy the following relations (1) and (2):

$$1.1 \leq KS/KJ \leq 2; \quad \text{relation (1); and}$$

$$1.3 \leq KT/\{(KS+KJ)/2\} \leq 2.5 \quad \text{relation (2).}$$

According to an embodiment of the present invention, KS and KJ of the sliding layer preferably satisfy the following relation (3):

$$1.1 \leq KS/KJ \leq 1.7 \quad \text{relation (3).}$$

According to an embodiment of the present invention, the synthetic resin preferably includes one or more selected from polyether ether ketone, polyether ketone, polyether sulfone, polyamidimide, polyimide, polybenzimidazole, nylon, phenol, epoxy, polyacetal, polyphenylene sulfide, polyethylene, and polyetherimide.

According to an embodiment of the present invention, the sliding layer preferably further includes 1 to 20 volume % of one or more solid lubricants selected from graphite, molybdenum disulfide, tungsten disulfide, boron nitride, and polytetrafluoroethylene.

According to an embodiment of the present invention, the sliding layer preferably further includes 1 to 10 volume % of one or more fillers selected from $CaF_2$, $CaCO_3$, talc, mica, mullite, iron oxide, calcium phosphate, potassium titanate, and $Mo_2C$.

According to an embodiment of the present invention, the sliding layer preferably further includes 1 to 35 volume % of one or more types of fibrous particles selected from glass fiber particles, ceramic fiber particles, carbon fiber particles, aramid fiber particles, acrylic fiber particles, and polyvinyl alcohol fiber particles.

According to an embodiment of the present invention, the back-metal layer preferably has a porous metal portion on a surface which is an interface between the back-metal layer and the sliding layer.

According to another aspect of the present invention, provided is a journal bearing including a plurality of the sliding members described above.

A configuration and advantages of the present invention are described in detail below with reference to the accompanying drawings. The drawings illustrate embodiments merely for illustration purpose, and the present invention is not limited to the embodiments.

DETAILED DESCRIPTION OF THE EMBODIMENT

Figure 3:
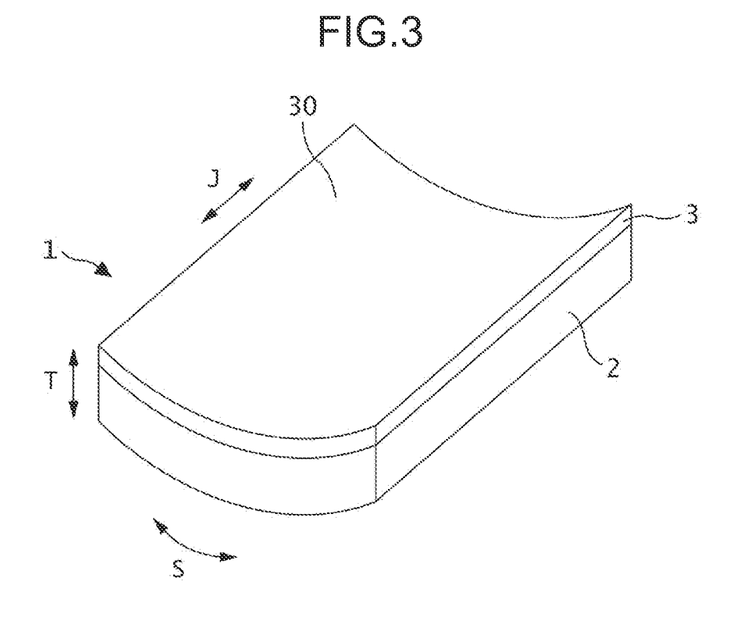
FIG. 3 is a schematic diagram of an embodiment of the sliding member according to the present invention.

FIG. 3 schematically shows an embodiment of a sliding member 1 having a partially cylindrical shape according to the present invention. The sliding member 1 has a shape composed of a portion obtained by dividing a cylindrical shape parallel to a center axis direction (J direction) of the cylindrical shape, that is, a partially cylindrical shape. An inner surface of the partially cylindrical shape forms a sliding surface 30 that slides against a counter shaft member when the sliding member 1 is used as a bearing. Accordingly, the sliding member 1 is configured such that a back-metal layer 2 is formed on an outer surface side of the sliding member 1 and a sliding layer 3 is formed on an inner surface side of the back-metal layer 2. Thus, the sliding surface 30, or an inner surface of the sliding layer 3, forms a concave surface, and the sliding surface 30 is designed to have a curvature corresponding to a curvature of the shaft member that is to face the sliding surface 30.

A circumferential direction of the cylindrical shape is referred to as "circumferential direction" (S direction). In the S direction, the sliding member having a partially cylindrical shape has a maximum curvature. Furthermore, the center axis direction of the cylindrical shape is referred to as "axial direction" (J direction). In the J direction, a straight line can be formed on the sliding surface of the partially cylindrical shape. Furthermore, a radial direction of the cylindrical shape is referred to as "vertical direction" (T direction). The T direction is perpendicular to the inner surface (sliding surface 30) of the partially cylindrical shape. When the sliding member 1 is used as the bearing, the shaft member slides in the "circumferential direction", and thus the "circumferential direction" is a sliding direction.

Figure 1:
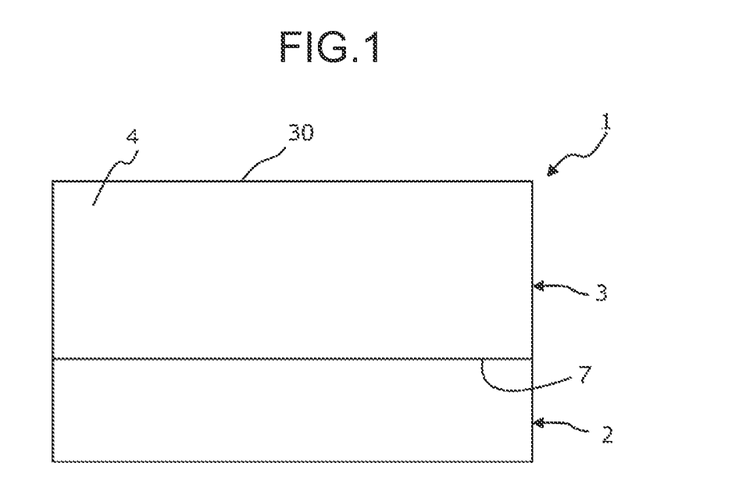
FIG. 1 shows a cross section of a sliding member according to an embodiment of the present invention.

FIG. 1 schematically shows a cross section of the sliding member 1 according to the present invention. The sliding member 1 includes the sliding layer 3 including a synthetic resin 4 on the back-metal layer 2. The surface of the sliding layer 3 (on a side opposite to the back-metal layer) functions as the sliding surface 30. The cross section shown in FIG. 1 is a cross section of the sliding member 1 in a direction perpendicular to the sliding surface 30.

The synthetic resin 4 preferably includes one or more selected from polyether ether ketone, polyether ketone, polyether sulfone, polyamidimide, polyimide, polybenzimidazole, nylon, phenol, epoxy, polyacetal, polyphenylene sulfide, polyethylene, and polyetherimide.

The sliding layer 3 may further include 1 to 20 volume % of one or more solid lubricants selected from graphite, molybdenum disulfide, tungsten disulfide, boron nitride, and polytetrafluoroethylene. The solid lubricant preferably has an average grain size of 0.5 to 20 µm. The sliding layer including the solid lubricant can have better sliding properties. The sliding layer 3 may further include 1 to 10 volume % of one or more fillers selected from $CaF_2$, $CaCO_3$, talc, mica, mullite, iron oxide, calcium phosphate, and $Mo_2C$ (molybdenum carbide). The filler preferably has an average grain size of 0.1 to 10 µm. The sliding layer including the filler can have higher wear resistance.

The sliding layer 3 may further include 1 to 35 volume % of fibrous particles dispersed in the synthetic resin 4. The fibrous particles are preferably one or more types of fibrous particles selected from glass fiber particles, ceramic fiber particles, carbon fiber particles, aramid fiber particles, acrylic fiber particles, polyvinyl alcohol fiber particles. The sliding layer including the fibrous particles can have higher strength.

The fibrous particles may have an average grain size of 0.1 to 25 µm (the grain size of each of the fibrous particles is a diameter of a perfect circle having an area equal to an area of the fibrous particle measured in cross-sectional observation, i.e., "equivalent circle diameter"). When the sliding member is used in a bearing device configured such that a high load is applied to the sliding layer, the sliding layer preferably includes fibrous particles having an average grain size of not less than 0.1 µm and less than 5 µm and a major axis length of not more than 15 µm. If the sliding layer includes fibrous particles having a major axis length of more than 15 µm, in some cases, a crack occurs in the large fibrous particles having a major axis length of more than 15 µm and exposed on the sliding surface, and the fibrous particles fall into a gap between the sliding surface and a surface of the shaft member, resulting in damage to the sliding surface. On the other hand, in the case of the sliding layer including fibrous particles having a major axis length of not more than 15 µm, even when the fibrous particles are exposed on the sliding surface, a crack is less likely to occur in the fibrous particles.

The back-metal layer 2 may be made of an Fe alloy such as hypoeutectoid steel or stainless steel, or a Cu alloy.

The sliding layer 3 preferably has a thickness (i.e., a distance in a direction perpendicular to the sliding surface 30 from the sliding surface 30 to an interface 7 between the sliding layer 3 and the back-metal layer 2) of 0.5 to 6 mm.

The sliding layer 3 has a linear expansion coefficient KS in the "circumferential direction" (S direction) of the sliding member 1, a linear expansion coefficient KJ in the "axial direction" (J direction) of the sliding member 1, and a linear expansion coefficient KT in the "vertical direction" (T direction) perpendicular to the sliding surface 30, and linear expansion coefficients KS, KJ and KT of the sliding layer 3 satisfy the following relations (1) and (2):

$$1.1 \leq KS/KJ \leq 2; \qquad \text{relation (1); and}$$

$$1.3 \leq KT/\{(KS+KJ)/2\} \leq 2.5 \qquad \text{relation (2)}.$$

In other words, the linear expansion coefficient KS of the sliding layer in the "circumferential direction" (S direction) of the sliding member is 1.1 to 2 times the linear expansion coefficient KJ of the sliding layer in the "axial direction" (J direction) of the sliding member, and the linear expansion coefficient KT of the sliding layer in the "vertical direction" (T direction) perpendicular to the sliding surface is 1.3 to 2.5 times an average value of the linear expansion coefficient KS of the sliding layer in the "circumferential direction" (S direction) of the sliding member and the linear expansion coefficient KJ of the sliding layer in the "axial direction" (J direction) of the sliding member.

The linear expansion coefficients KS, KJ and KT of the sliding layer 3 are each an average linear expansion coefficient at a temperature of 23° C. to 100° C.

The linear expansion coefficient KS in the "circumferential direction" (S direction) of the sliding member is preferably 1.1 to 1.7 times the linear expansion coefficient KJ in the "axial direction" (J direction) of the sliding member (i.e., 1.1≤KS/KJ≤1.7).

It is known that synthetic resins have a large amount of thermal expansion. A synthetic resin is composed of a large number of molecular chains (high polymers) by which a large number of resin molecules are linked together, and the molecular chains of the resin are merely connected by the Van der Waals force and weakly bonded to each other. Thus, when the temperature increases, a gap (distance) between the molecular chains is greatly increased. On the other hand, an amount of thermal expansion in a longitudinal direction of the molecular chains of the resin connected by a covalent bond is small. When an external force applied to the synthetic resin causes breakage, breakage mainly occurs between the weakly bonded molecular chains of the resin, and the molecular chain itself is less likely to be broken.

When the bearing device is started to operate, the surface of the sliding layer 3 of the sliding member 1 is in direct contact with the surface of the shaft member. Thus, a temperature near the sliding surface of the sliding layer 3 increases due to friction generated by sliding, and at the same time, an external force (load) is applied from the shaft member to the sliding layer. At that time, the sliding surface 30 in contact with the shaft member is dragged by the rotating shaft member and elastically deformed in a rotation direction of the shaft member (the circumferential direction S of the sliding member 1 having a partially cylindrical shape). At this time, if an amount of thermal expansion of the synthetic resin 4 of the sliding layer 3 in the axial direction J of the sliding member 1 having a partially cylindrical shape is large, a large gap is generated between molecular chains (linear portions 42) of the synthetic resin, and the external force from the shaft member is more likely to cause breakage. Thus, damage such as a crack that extends in a substantially circumferential direction from the broken portion as a starting point may occur on the surface of the sliding layer.

In the sliding layer 3 of the sliding member 1 of the present invention, the linear expansion coefficient KS of the sliding layer in the "circumferential direction" (S direction) of the sliding member is 1.1 to 2 times the linear expansion coefficient KJ of the sliding layer in the "axial direction" (J direction) of the sliding member, and the linear expansion coefficient KT of the sliding layer in the "vertical direction" (T direction) perpendicular to the sliding surface 30 is 1.3 to 2.5 times the average value of the linear expansion coefficient KS of the sliding layer in the "circumferential direction" (S direction) of the sliding member and the linear expansion coefficient KJ of the sliding layer in the "axial direction" (J direction) of the sliding member. This leads to a large amount of thermal expansion of the sliding layer 3 in the circumferential direction (S direction) and the vertical direction (T direction) and prevention of thermal expansion of the sliding layer 3 in the axial direction (J direction). Thus, even when an external force in the circumferential direction (S direction) is applied from the shaft member to the sliding surface 30, a crack that extends in a substantially circumferential direction is less likely to occur on the sliding surface 30.

If an amount of thermal expansion of the sliding layer 3 in an in-plane direction (the circumferential direction S and the axial direction J) of the sliding surface 30 is large, shearing stress is generated, due to a difference in the amount of thermal expansion, at the interface between the sliding layer 3 and the back-metal layer 2 made of metal, and shear failure may occur between the sliding layer 3 and the back-metal layer 2.

In the sliding layer 3 of the sliding member 1 of the present invention, the linear expansion coefficient KT of the sliding layer in the "vertical direction" (T direction) perpendicular to the sliding surface 30 is 1.3 to 2.5 times the average value of the linear expansion coefficient KS of the sliding layer in the "circumferential direction" (S direction) of the sliding member and the linear expansion coefficient KJ of the sliding layer in the "axial direction" (J direction) of the sliding member. This leads to a large amount of thermal expansion of the sliding layer 3 in the "vertical direction" (T direction) and prevention of thermal expansion of the sliding layer 3 in a direction parallel to the sliding surface 30. Thus, shear failure is less likely to occur between the sliding layer 3 and the back-metal layer 2.

Figure 4:
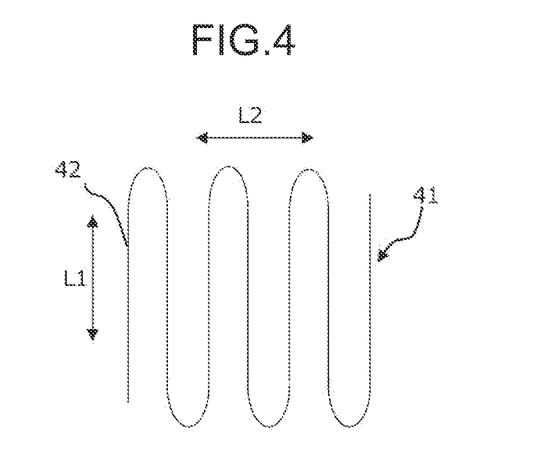
FIG. 4 is a schematic diagram showing an image of a molecular chain (bent structure) of a resin.

An anisotropy of thermal expansion of the sliding layer 3 is presumably caused by orientation of the molecular chains of the resin molecules. As shown in FIG. 4, a molecular chain 41 of the resin molecule in the synthetic resin 4 of the sliding layer 3 has a bent structure (bent crystal) having a plurality of linear portions 42. In a longitudinal direction L1 of the linear portion 42, thermal expansion is less likely to occur. In a direction L2 orthogonal to the longitudinal direction of the linear portion 42, a gap is formed between the linear portions 42, and thus thermal expansion is more likely to occur. The anisotropy of thermal expansion of the sliding layer 3 of the sliding member 1 of the present invention is presumably caused by the fact that a ratio of the molecular chains 41 of the resin in the sliding layer 3 that are oriented in the longitudinal direction L1 of the linear portion 42 is different between the "axial direction" (J direction) side, the "circumferential direction" (S direction) side, and the "vertical direction" (T direction) side. The anisotropy of thermal expansion of the sliding layer 3 is generated during manufacture of a resin composition sheet (described later).

A different configuration from above-described configuration of the present invention has the following problems.

If the linear expansion coefficient KS of the sliding layer in the "circumferential direction" (S direction) is larger than the linear expansion coefficient KJ of the sliding layer in the "axial direction" (J direction) but is less than 1.1 times the linear expansion coefficient KJ, the effect of preventing thermal expansion of the sliding layer in the "axial direction" (J direction) is insufficient, and a crack is more likely to occur on the sliding surface.

If the linear expansion coefficient KS of the sliding layer in the "circumferential direction" (S direction) exceeds 2 times the linear expansion coefficient KJ of the sliding layer in the "axial direction" (J direction), due to an excessively large amount of thermal expansion of the sliding layer in the "circumferential direction" (S direction), a crack that extends in a substantially axial direction may occur on the sliding surface.

If the linear expansion coefficient KT in the "vertical direction" (T direction) perpendicular to the sliding surface is larger than the average value of the linear expansion coefficient KS in the "circumferential direction" (S direction) of the sliding member and the linear expansion coefficient KJ in the "axial direction" (J direction) of the sliding member but is less than 1.3 times the average value of the linear expansion coefficient KS and the linear expansion coefficient KJ, the effect of preventing thermal expansion of the sliding layer in a direction parallel to the sliding surface is insufficient, and thus a crack is more likely to occur on the sliding surface, and shear failure is more likely to occur between the sliding layer 3 and the back-metal layer 2. Furthermore, if in the sliding layer 3, the linear expansion coefficient KT in the "vertical direction" (T direction) perpendicular to the sliding surface exceeds 2.5 times the average value of the linear expansion coefficient KS in the "circumferential direction" (S direction) of the sliding member and the linear expansion coefficient KJ in the "axial direction" (J direction) of the sliding member, due to an excessively large amount of thermal expansion of the sliding layer in the "vertical direction" (T direction), a crack may occur inside the sliding layer.

Unlike the configuration of the present invention, in a case of a sliding member in which isotropic thermal expansion occurs throughout a sliding layer, in a situation where a sliding surface of the sliding member is in direct contact with a counter shaft member immediately after operation of a bearing device is started, a resin composition near the surface of the sliding layer in contact with the shaft member is thermally expanded in the circumferential direction (sliding direction), and is dragged by the surface of the shaft member, leading to a crack between molecular chains of a resin of the sliding layer. Thus, damage such as a crack is more likely to occur on the surface of the sliding layer, and due to a difference in the amount of thermal expansion between the sliding layer and a back-metal layer, damage such as shear failure is more likely to occur at an interface between the sliding layer and the back-metal layer.

Figure 2:
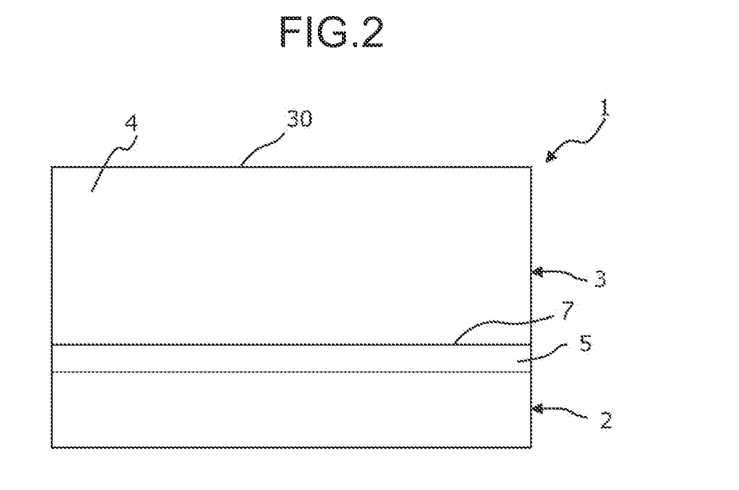
FIG. 2 shows a cross section of a sliding member according to another embodiment of the present invention.

The back-metal layer 2 may have a porous metal portion 5 at the interface between the back-metal layer 2 and the sliding layer 3. FIG. 2 schematically shows a circumferential cross section of an example of the sliding member 1 including the back-metal layer 2 having the porous metal portion 5. The porous metal portion 5 provided on the surface of the back-metal layer 2 can improve bonding strength between the sliding layer and the back-metal layer. This is due to an anchor effect by impregnating into pores of the porous metal portion with the composition constituting the sliding layer. The anchor effect can enhance a bonding force between the back-metal layer and the sliding layer.

The porous metal portion can be formed by sintering a metal powder made of Cu, a Cu alloy, Fe, an Fe alloy or the like on a surface of a metal plate or strip or the like. The porous metal portion may have a porosity of approximately 20 to 60%. The porous metal portion may have a thickness of approximately 50 to 500 μm. In this case, the sliding layer coated on a surface of the porous metal portion may have a thickness of approximately 0.5 to 6 mm. The dimensions described above are merely examples. The present invention is not limited to the above values, and the dimensions may be changed to other dimensions.

The sliding member 1 may be used, for example, in a journal bearing (radial bearing). For example, the bearing includes a housing (including one, two, three, or more housing elements) that forms a columnar internal cavity. The housing includes one or more, typically two housing elements. A plurality of the sliding members are arranged in the circumferential direction on an inner surface of the internal cavity, and the sliding members support a counter shaft which is a shaft member. The partially cylindrical shape (curvature, size, and the like) of the sliding member is designed to match the internal cavity and the shaft member. However, the sliding member may also be used in a bearing having a different configuration or for other sliding applications.

The present invention also encompasses a journal bearing including a plurality of the sliding members.

The above sliding member is described in detail below referring to a manufacturing process.

(1) Preparation of Synthetic Resin Raw Material Particles

A raw material of the synthetic resin may be one or more selected from polyether ether ketone, polyether ketone, polyether sulfone, polyamidimide, polyimide, polybenzimidazole, nylon, phenol, epoxy, polyacetal, polyphenylene sulfide, polyethylene, and polyetherimide. Optionally, fibrous particles, a solid lubricant, a filler, or the like may be dispersed in the synthetic resin.

(2) Manufacture of Synthetic Resin Sheet

A synthetic resin sheet is produced from the above raw material and the like with use of a melt-kneading machine, a supplying mold, a sheet forming mold, and a cooling roll.

"Melt-Kneading Machine"

The synthetic resin raw material particles and raw materials of other optional materials (fibrous particles, solid lubricant, filler, and the like) are mixed while being heated at a temperature of 230° C. to 390° C. with use of the melt-kneading machine to produce a resin composition in a molten state. The synthetic resin raw material particles include a plurality of resin molecules having a structure in which a molecular chain is bent to have a plurality of linear portions. The resin molecules entangled with each other are disentangled by the melt-kneading process. The resin composition is extruded under constant pressure from the melt-kneading machine.

"Supplying Mold"

A certain amount of resin composition extruded from the melt-kneading machine is constantly supplied to the sheet forming mold via the supplying mold. The supplying mold includes a heating heater for heating the resin composition passing through the supplying mold at a temperature of 385° C. to 400° C. to maintain the resin composition in a molten state.

"Sheet Forming Mold"

The resin composition is formed into a sheet shape by the sheet forming mold. The resin composition in a molten state supplied from the supplying mold to the sheet forming mold is formed into a sheet shape, and is gradually cooled naturally while being moved toward an outlet side in the sheet forming mold to form a sheet in a semi-molten state.

"Cooling Roll"

The resin composition sheet in a semi-molten state is drawn from the "sheet forming mold" while being continuously brought into contact with the cooling roll to be cooled. The cooling roll includes at least a pair of rolls (upper roll and lower roll) that move the resin composition sheet while pressing the resin composition sheet from both sides, i.e., an upper surface side and a lower surface side. After being drawn from the cooling roll, the resin composition sheet in a semi-molten state becomes a sheet in a completely solid state. A temperature of the cooling roll can be controlled by an electric heater incorporated in the roll. Furthermore, the cooling roll can be rotationally driven by being controlled by an electric motor. The resin composition sheet has a thickness, for example, of 1 to 7 mm. The resin composition sheet in a solid state is cut into a size corresponding to that of a back metal used at a later-described coating step.

(3) Back Metal

The back-metal layer may be a metal plate made of an Fe alloy such as hypoeutectoid steel or stainless steel, Cu, a Cu alloy, or the like. A porous metal portion may be formed on a surface of the back-metal layer, i.e., an interface between the back-metal layer and the sliding layer. In that case, the porous metal portion may have the same composition as the back-metal layer. Alternatively, the porous metal portion may have a different composition from the back-metal layer or may be made of a different material from the back-metal layer.

(4) Coating and Forming Step

The resin composition sheet is bonded to one surface of the back-metal layer or the porous metal portion of the back metal. At that time, the resin composition sheet is placed so that the direction in which the resin composition sheet has been drawn in the sheet forming step is an axial direction of a partially cylindrical shape. Subsequently, the composition is formed by pressure-pressing into a shape for use, for example, a partially cylindrical shape. Then, the sliding layer and the back metal are processed or cut so that the composition has a uniform thickness.

Next, a method of controlling the anisotropy of the linear expansion coefficient is described. The anisotropy of the linear expansion coefficient is controlled by controlling a rotational speed of the cooling roll in the process of manufacturing a resin composition sheet. Specifically, the rotational speed of the cooling roll is set so that a ratio $V_2/V_1$ is 0.8 to 0.9, where $V_1$ represents a speed at which the sheet in a semi-molten state is extruded from the sheet forming mold, and $V_2$ represents a speed of the sheet in a completely solidified state drawn from the cooling roll. The ratio of 0.8 to 0.9 is a ratio between $v_1$ and $v_2$ ($v_2/v_1=V_2/V_1=0.8$ to 0.9), where $v_1$ represents a volume per unit time of the resin composition sheet extruded from the sheet forming mold by pressure from the supplying mold and supplied to the cooling roll, and $v_2$ represents a volume per unit time of the resin composition sheet drawn from the cooling roll. Due to a difference between the volume $v_1$ of the resin composition sheet supplied to the cooling roll and the volume $v_2$ of the resin composition sheet drawn from the cooling roll, a resin sump 15 of the semi-molten resin composition is formed at an inlet of the upper cooling roll.

Figure 5:
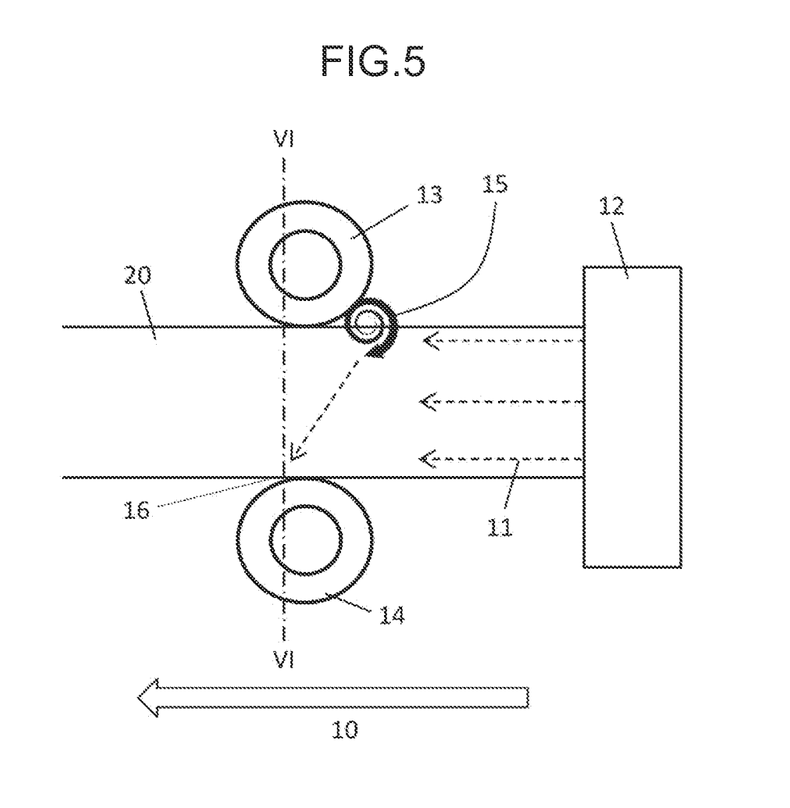
FIG. 5 is a view showing a flow of resin.
Figure 6:
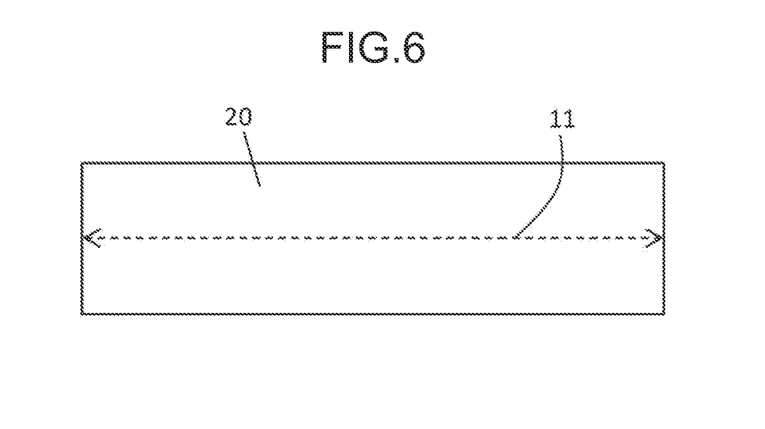
FIG. 6 shows a VI-VI cross section of a resin sheet in FIG. 5.

The resin sheet in a semi-molten state is solidified while being brought into contact with the cooling roll to be cooled. The speed of the cooling roll is set to be lower than the speed at which the resin composition in a semi-molten state is extruded from the mold. Thus, the resin composition in a semi-molten state that has not been completely solidified tends to be accumulated (hereinafter referred to as "resin sump") at the inlet of the upper cooling roll. FIG. 5 schematically shows this state. A resin composition sheet 20 is extruded in a direction (extrusion direction 10) from the right side toward the left side of FIG. 5. An arrow 11 indicates a flow of semi-molten resin composition. The semi-molten resin composition 11 flowing from a sheet forming mold 12 (from the right side of FIG. 5) forms a certain amount of resin sump 15 on an inlet side of an upper cooling roll 13. The resin composition 11 in a semi-molten state (hereinafter referred to as "semi-molten resin composition") that forms the resin sump 15 is pushed into the resin composition sheet while being rotated in the same direction as the extrusion direction and accumulated. A part of the semi-molten resin composition 11 pushed into the resin composition sheet is spread and flows toward both ends in a width direction of the resin composition sheet and starts to be solidified (FIG. 6). It has been found that when the molten resin flows, the longitudinal directions of the linear portions of the molecular chains of the resin are more likely to be oriented in the flow direction. Thus, the longitudinal directions of the linear portions of the molecular chains of the resin are more likely to be oriented also in the width direction of the resin composition sheet (direction perpendicular to the extrusion direction 10).

In a conventional technique, the speed of the cooling roll is set to the same speed as the speed at which the resin composition in a semi-molten state is extruded from the mold. In this case, the semi-molten resin composition flowing from the sheet forming mold constantly flows in a single direction toward an outlet side of the cooling roll without forming a resin sump on the inlet side of the cooling roll. Thus, the longitudinal directions of the linear portions of the molecular chains of the resin are mainly oriented in the extrusion direction of the resin composition sheet and are less likely to be oriented in the width direction of the resin composition sheet.

Furthermore, JP 2018-146059A discloses that a resin composition sheet is manufactured by performing cooling in a forming mold and periodically changing a drawing speed of a drawing roll. When a resin composition sheet is manufactured in this manner, the longitudinal directions of linear portions of molecular chains of the resin are more likely to be mainly oriented in a thickness direction of the resin composition sheet.

Next, a method of measuring the linear expansion coefficient of the sliding layer is described. From the sliding layer, a rectangular-parallelepiped-shaped specimen having a size of 4 mm×5 mm (measurement direction)×10 mm is produced to measure the linear expansion coefficient KS of the sliding layer in a direction parallel to the circumferential direction and the linear expansion coefficient KJ of the sliding layer in a direction parallel to the center axis direction. Furthermore, from the sliding layer, a rectangular-parallelepiped-shaped specimen having a size of 5 mm×5 mm×4 mm (measurement direction) is produced to measure the linear expansion coefficient KT of the sliding layer in a direction perpendicular to the sliding surface. Then, in the specimens, the linear expansion coefficients KS, KJ and KT can be measured under conditions shown in Table 1 with use of a thermal expansion measuring device (TMA/SS7100: manufactured by SII). These linear expansion coefficients are an average linear expansion coefficient in a test temperature range.

TABLE 1

| Test load (compressive load) | 4 kPa |
| Temperature increasing rate | 5° C./minute |
| Measurement atmosphere | Nitrogen (100 ml/minute) |
| Test temperature range | 23 to 100° C. |

EXAMPLES

Examples 1 to 6 of the sliding member including the back-metal layer and the sliding layer according to the present invention and Comparative Examples 11 to 14 were produced in the following manner. Table 2 shows composition of the sliding layer of the sliding members of Examples and Comparative Examples.

TABLE 2

| | Sample | | Composition (volume %) | | | | | Linear expansion Coefficient ($\times 10^{-5}/°C.$) | | | | KS/KJ | KT/((KS + KJ)/2) | Sliding test results | | | |
|---|---|---|---|---|---|---|---|---|---|---|---|---|---|---|---|---|---|
| | | | | | | | | | | | | | | Conditions 1 | | Conditions 2 | |
| | | | | | | | | | | | | | | Presence of cracks | Presence of shear failure at interface | Presence of cracks | Presence of shear failure at interface |
| | | PEEK | PEK | Ceramic fibers | Carbon fibers | Graphite | PTFE | CaF2 | KS | KJ | KT | KJ | | | | | |
| Examples | 1 | 100 | | | | | | | 6.8 | 3.6 | 6.8 | 1.9 | 1.3 | Not present | Not present | Present | Not present |
| | 2 | 100 | | | | | | | 4.9 | 3.3 | 7.9 | 1.5 | 1.9 | Not present | Not present | Not present | Not present |
| | 3 | 100 | | | | | | | 3.6 | 3.2 | 8.6 | 1.1 | 2.5 | Not present | Not present | Not present | Not present |
| | 4 | | 100 | | | | | | 5 | 3.6 | 7.7 | 1.4 | 1.8 | Not present | Not present | Not present | Not present |
| | 5 | 78 | | | 20 | | | 2 | 4.6 | 2.8 | 6.3 | 1.6 | 1.7 | Not present | Not present | Not present | Not present |
| | 6 | 78 | | 15 | | 5 | | 2 | 4.3 | 2.9 | 6.4 | 1.5 | 1.8 | Not present | Not present | Not present | Not present |
| Comparative Examples | 11 | 100 | | | | | | | 7.7 | 3.7 | 6.3 | 2.1 | 1.1 | Present | Not present | — | — |
| | 12 | 100 | | | | | | | 3.3 | 3.3 | 8.7 | 1.0 | 2.6 | Present | Not present | — | — |
| | 13 | 80 | | 15 | | 5 | | 2 | 2.9 | 4.3 | 6.4 | 0.7 | 1.8 | Present | Not Present | — | — |
| | 14 | 78 | | | 20 | | | 2 | 4.7 | 7.7 | 3.8 | 0.6 | 0.6 | Present | Present | — | — |

In Examples 1 to 6 and Comparative Examples 11 to 14, PEEK (polyether ether ketone) particles or PEK (polyether ketone) particles were used as a raw material of the synthetic resin. In Example 6 and Comparative Example 13, the raw material of the synthetic resin included ceramic fibers. As the ceramic fibers, fibrous particles of potassium titanate having an average grain size of approximately 5 μm were used. In Example 5 and Comparative Example 14, the raw material of the synthetic resin included carbon fibers. As the carbon fibers, fibrous particles having an average grain size of 5 μm were used.

In Examples 5 and 6 and Comparative Examples 13 and 14, the raw material of the synthetic resin included a solid lubricant (graphite, PTFE), and raw material particles of the solid lubricant had an average grain size of 10 μm. In Example 6 and Comparative Example 13, the raw material of the synthetic resin included a filler ($CaF_2$), and raw material particles of the filler had an average grain size of 10 μm.

The above raw materials were weighed at a composition ratio shown in Table 2, and the compositions were pelleted in advance. The pellets were inserted into a melt-kneading machine in which a heating temperature was set at 350 to 390° C., and the pellets were sequentially passed through a supplying mold, a sheet forming mold, and a cooling roll to produce a resin composition sheet. A rotational speed of the cooling roll was set so that a ratio $V_2/V_1$ was 0.90 in Example 1, 0.85 in Examples 2 and 4 to 6, and 0.80 in Example 3 to produce a resin composition sheet, where $V_1$ represents a speed at which the sheet in a semi-molten state was extruded from the sheet forming mold, and $V_2$ represents a speed of the sheet in a completely solidified state drawn from the cooling roll. The rotational speed of the cooling roll was set so that the ratio $V_2/V_1$ was 1 in Comparative Example 11, 0.75 in Comparative Example 12, and 0.85 in Comparative Example 13 to produce a resin composition sheet. In Comparative Example 14, a resin composition sheet was produced by using the method described in JP 2018-146059A.

Next, the resin composition sheet was coated on one surface of a back-metal layer made of an Fe alloy, and was then processed into a partially cylindrical shape. Subsequently, cutting processing was performed so that the composition on the back-metal layer had a predetermined thickness. In Examples 1 to 5 and Comparative Examples 11 to 14, the back-metal layer was made of an Fe alloy. In Example 6, the back-metal layer had a porous sintered portion made of a Cu alloy on the surface of the portion made of an Fe alloy. For the sliding members of Examples 1 to 6 and Comparative Examples 11, 12, and 14, an extrusion direction of the resin composition sheet at the sheet forming step was set to be parallel to an axial direction of the partially cylindrical shape. For the sliding member of Comparative Example 13, the extrusion direction of the resin composition sheet at the sheet forming step was set to be perpendicular to the axial direction of the partially cylindrical shape.

In the sliding members produced in Examples 1 to 6 and Comparative Examples 11 to 14, the sliding layer had a thickness of 5 mm, and the back-metal layer had a thickness of 10 mm.

In the sliding members produced in Examples and Comparative Examples, the linear expansion coefficient KS of the sliding layer in the circumferential direction, the linear expansion coefficient KJ of the sliding layer in the axial direction, and the linear expansion coefficient KT of the sliding layer in the vertical direction were measured by the measurement method described above. These linear expansion coefficients were an average linear expansion coefficient at 23° C. to 100° C. In Table 2, with regard to the measurement results of Examples and Comparative Examples, a column "KS" indicates the linear expansion coefficient KS of the sliding layer in the circumferential direction, a column "KJ" indicates the linear expansion coefficient KJ of the sliding layer in the axial direction, and a column "KT" indicates the linear expansion coefficient KT of the sliding layer in the vertical direction.

Furthermore, with regard to the measurement results of Examples and Comparative Examples, a column "KS/KJ" in Table 2 indicates a ratio (KS/KJ) between the linear expansion coefficient KS of the sliding layer in the circumferential direction and the linear expansion coefficient KJ of the sliding layer in the axial direction, and a column "KT/((KS+KJ)/2)" in Table 2 indicates a ratio (KT/(KS+KJ)/2) between the linear expansion coefficient KT of the sliding layer in the vertical direction and an average value of the linear expansion coefficient KJ of the sliding layer in the axial direction and the linear expansion coefficient KS of the sliding layer in the circumferential direction.

The plurality of sliding members formed into a partially cylindrical shape were combined to form a cylindrical shape, and the combined sliding members were subjected to a sliding test under two conditions shown in Table 3. Under conditions 2, a higher load was applied to the sliding layer than under conditions 1. These conditions simulated a sliding state where operation of a bearing device was stopped and a shaft member was rotated for a certain time with insufficient oil supply. In Examples and Comparative Examples, a plurality of portions on a surface of the sliding layer after the sliding test were measured with use of a roughness measuring device and evaluated for the presence of cracks. In a column "Presence of cracks" in Table 2, "Present" indicates that a crack having a depth of not less than 5 µm was observed on the surface of the sliding layer, and "Not present" indicates that no such crack was observed. Furthermore, a specimen of the sliding member after the sliding test was cut in a direction parallel to the circumferential direction of the sliding member and perpendicular to the sliding surface, and the specimen was observed for the presence of "shear failure" at an interface between the sliding layer and the back metal with use of an optical microscope. In a column "Presence of shear failure at interface" in Table 2, "Present" indicates that "shear failure" was observed at the interface, and "Not present" indicates that no "shear failure" was observed at the interface.

TABLE 3

| Testing device | Conditions 1 Journal tester | Conditions 2 Journal tester |
|---|---|---|
| Load | 25 MPa | 50 MPa |
| Rotational speed | 500 r/minute | 500 r/minute |
| Operation time | 24 hours | 24 hours |
| Rotation time after stop | 15 minutes | 15 minutes |
| Oil | VG46 | VG46 |
| Oil supply amount during operation | 50 cc/minute | 50 cc/minute |
| Oil supply temperature | 50° C. | 50° C. |
| Counter shaft | SUJ2 | SUJ2 |
| Shaft roughness | 0.2 Ra | 0.2 Ra |

As shown in the results in Table 2, Examples showed no crack on the surface of the sliding layer or no shear failure at the interface after the sliding test under conditions 1. As described above, this is presumably because the sliding layer had the anisotropy of thermal expansion that satisfied the above relations (1) and (2) in the circumferential direction, the axial direction, and the vertical direction. Furthermore, in Examples 2 to 6 in which the sliding layer had the anisotropy of thermal expansion that satisfied the above relation (3), no crack was observed on the surface of the sliding layer after the sliding test even under conditions 2 under which a higher load was applied to the sliding layer.

On the other hand, in Comparative Example 11, the ratio (KS/KJ) between the linear expansion coefficient KS of the sliding layer in the circumferential direction and the linear expansion coefficient KJ of the sliding layer in the axial direction exceeded 2. Presumably due to an excessively large amount of thermal expansion of the sliding layer in the circumferential direction, a crack occurred on the sliding surface.

On the other hand, in Comparative Example 12, the ratio (KS/KJ) between the linear expansion coefficient KS of the sliding layer in the circumferential direction and the linear expansion coefficient KJ of the sliding layer in the axial direction was less than 1.1. Presumably due to an insufficient effect of preventing thermal expansion of the sliding layer in the axial direction, a crack occurred on the sliding surface. Furthermore, in Comparative Example 12, since the ratio (KT/(KS+KJ)/2) between the linear expansion coefficient KT of the sliding layer in the vertical direction and the average value of the linear expansion coefficient KJ of the sliding layer in the axial direction and the linear expansion coefficient KS of the sliding layer in the circumferential direction exceeded 2.5 times, a crack also occurred inside the sliding layer.

In Comparative Example 13, presumably since the ratio (KS/KJ) between the linear expansion coefficient KS of the sliding layer in the circumferential direction and the linear expansion coefficient KJ of the sliding layer in the axial direction was less than 1.1, a crack occurred on the sliding layer.

In Comparative Example 14, since the ratio (KS/KJ) between the linear expansion coefficient KS of the sliding layer in the circumferential direction and the linear expansion coefficient KJ of the sliding layer in the axial direction was less than 1.1, a crack occurred on the sliding layer. Furthermore, the ratio (KT/(KS+KJ)/2) between the linear expansion coefficient KT of the sliding layer in the vertical direction and the average value of the linear expansion coefficient KJ of the sliding layer in the axial direction and the linear expansion coefficient KS of the sliding layer in the circumferential direction was less than 1.3. Presumably due to an insufficient effect of preventing thermal expansion of the sliding layer in a direction parallel to the sliding surface, shear failure occurred at the interface between the sliding layer and the back metal.

The invention claimed is:

1. A sliding member for a journal bearing, the sliding member comprising:
   a back-metal layer; and
   a sliding layer on the back-metal layer,
   wherein the sliding member has a partially cylindrical shape,
   wherein the sliding layer includes a synthetic resin and has a sliding surface, and
   wherein the sliding layer has a linear expansion coefficient KS in a direction parallel to a circumferential direction of the sliding member, a linear expansion coefficient KJ in a direction parallel to a center axis direction of the sliding member, and a linear expansion coefficient KT in a direction perpendicular to the sliding surface, and the linear expansion coefficients KS, KJ and KT satisfy the following relations (1) and (2):

$$1.1 \leq KS/KJ \leq 2; \quad \text{relation (1); and}$$

$$1.3 \leq KT/\{(KS+KJ)/2\} \leq 2.5 \quad \text{relation (2).}$$

2. The sliding member according to claim 1, wherein the linear expansion coefficients KS and KJ of the sliding layer satisfy the following relation (3):

$$1.1 \leq KS/KJ \leq 1.7 \quad \text{relations (3).}$$

3. The sliding member according to claim 1, wherein the synthetic resin includes one or more selected from polyether ether ketone, polyether ketone, polyether sulfone, polyamidimide, polyimide, polybenzimidazole, nylon, phenol, epoxy, polyacetal, polyphenylene sulfide, polyethylene, and polyetherimide.

4. The sliding member according to claim 1, wherein the sliding layer further includes 1 to 20 volume % of one or more solid lubricants selected from graphite, molybdenum disulfide, tungsten disulfide, boron nitride, and polytetrafluoroethylene.

5. The sliding member according to claim 1, wherein the sliding layer further includes 1 to 10 volume % of one or more fillers selected from $CaF_2$, $CaCO_3$, talc, mica, mullite, iron oxide, calcium phosphate, potassium titanate, and $Mo_2C$.

6. The sliding member according to claim 1, wherein the sliding layer further includes 1 to 35 volume % of one or more types of fibrous particles selected from glass fiber particles, ceramic fiber particles, carbon fiber particles, aramid fiber particles, acrylic fiber particles, and polyvinyl alcohol fiber particles.

7. The sliding member according to claim 1, wherein the sliding layer further includes:
- 1 to 20 volume % of one or more solid lubricants selected from graphite, molybdenum disulfide, tungsten disulfide, boron nitride, and polytetrafluoroethylene; and
- 1 to 10 volume % of one or more fillers selected from $CaF_2$, $CaCO_3$, talc, mica, mullite, iron oxide, calcium phosphate, potassium titanate, and $Mo_2C$.

8. The sliding member according to claim 1, wherein the sliding layer further includes:
- 1 to 20 volume % of one or more solid lubricants selected from graphite, molybdenum disulfide, tungsten disulfide, boron nitride, and polytetrafluoroethylene; and
- 1 to 35 volume % of one or more types of fibrous particles selected from glass fiber particles, ceramic fiber particles, carbon fiber particles, aramid fiber particles, acrylic fiber particles, and polyvinyl alcohol fiber particles.

9. The sliding member according to claim 1, wherein the sliding layer further includes:
- 1 to 20 volume % of one or more solid lubricants selected from graphite, molybdenum disulfide, tungsten disulfide, boron nitride, and polytetrafluoroethylene;
- 1 to 10 volume % of one or more fillers selected from $CaF_2$, $CaCO_3$, talc, mica, mullite, iron oxide, calcium phosphate, potassium titanate, and $Mo_2C$; and
- 1 to 35 volume % of one or more types of fibrous particles selected from glass fiber particles, ceramic fiber particles, carbon fiber particles, aramid fiber particles, acrylic fiber particles, and polyvinyl alcohol fiber particles.

10. The sliding member according to claim 1, wherein the back-metal layer includes a porous metal portion as an interface between the back-metal layer and the sliding layer.

11. A journal bearing comprising a plurality of the sliding members according to claim 1.

* * * * *